(12) United States Patent
Deser et al.

(10) Patent No.: US 11,145,919 B2
(45) Date of Patent: Oct. 12, 2021

(54) COOLING DEVICE AND PROCESS

(71) Applicant: Lisa Draexlmaier GmbH, Vilsbiburg (DE)

(72) Inventors: Stefan Deser, Landshut (DE); Stefan Seidl, Landshut (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 161 days.

(21) Appl. No.: 15/607,550

(22) Filed: May 29, 2017

(65) Prior Publication Data

US 2017/0346143 A1  Nov. 30, 2017

(30) Foreign Application Priority Data

May 30, 2016 (DE) .................... 10 2016 109 931.7

(51) Int. Cl.
| | |
|---|---|
| *H01M 10/653* | (2014.01) |
| *H01M 10/6556* | (2014.01) |
| *H01M 10/613* | (2014.01) |
| *H01M 10/625* | (2014.01) |
| *H01M 10/6554* | (2014.01) |

(52) U.S. Cl.
CPC ....... *H01M 10/653* (2015.04); *H01M 10/613* (2015.04); *H01M 10/625* (2015.04); *H01M 10/6554* (2015.04); *H01M 10/6556* (2015.04); *H01M 2220/20* (2013.01)

(58) Field of Classification Search
CPC ............. H01M 10/653; H01M 10/613; H01M 10/625; H01M 10/6554; H01M 10/6556
See application file for complete search history.

(56) References Cited

U.S. PATENT DOCUMENTS

| | | | | |
|---|---|---|---|---|
| 2004/0081843 | A1* | 4/2004 | Bunyan | H01L 23/4275 428/517 |
| 2011/0206948 | A1* | 8/2011 | Asai | H01M 2/0473 429/7 |
| 2014/0322582 | A1* | 10/2014 | Ruter | H01M 2/1072 429/120 |
| 2016/0322679 | A1 | 11/2016 | Landerer et al. | |

FOREIGN PATENT DOCUMENTS

| | | |
|---|---|---|
| DE | 69702867 | 1/2001 |
| DE | 69705048 | 11/2001 |
| EP | 2511922 | 10/2012 |

* cited by examiner

*Primary Examiner* — Helen Oi K Conley
(74) *Attorney, Agent, or Firm* — Burris Law, PLLC (57) ABSTRACT

The present disclosure includes a cooling device with a cooling plate for an energy storage unit to be cooled that is arranged or capable of being arranged thereupon and that is in thermal contact with the cooling plate, wherein a thermally conductive foil and a thermally conductive filler layer are arranged between the energy storage unit and the cooling plate.

13 Claims, 4 Drawing Sheets

COOLING DEVICE AND PROCESS

CROSS-REFERENCE TO RELATED APPLICATIONS

This application claims priority to and the benefit of DE 10 2016 109 931.7 filed on May 30, 2016. The disclosure of the above application is incorporated herein by reference.

FIELD

The present disclosure relates to a cooling device for an energy storage unit, particularly for motor vehicles, and to a corresponding production process.

BACKGROUND

The statements in this section merely provide background information related to the present disclosure and may not constitute prior art.

Presently known (high-voltage) battery systems generally call for the possibility of dismounting the individual battery modules for servicing. A prerequisite for this is that it be possible to remove these modules without damage to the modules themselves or to adjacent components.

So-called gap fillers or gap pads are used to balance existing tolerances between the battery module and the cooling system or a thermally conductive component. These gap fillers level off irregularities, thereby providing a uniform thermal connection of the battery module.

Gap pads are insertable mats that retain their shape. They are available with adhesive and with non-adhesive properties. However, a major disadvantage of this material is that it must be compressed to a certain minimum size in order to ensure complete compensation of the tolerances. This in turn requires strong forces that cannot readily be absorbed by the supporting surface (such as a base plate or the cooling), or if so, then only to an inadequate degree. Another disadvantage of gap pads is that in spite of being compressed, they are thicker than gap fillers, which is a disadvantage due to the thermal resistance.

So-called gap fillers are gelatinous or pasty materials which are applied and provide the connection to the module over a large area by spreading out upon compression. The advantage of this is that these forces are considerably lower than in the case of gap pads. However, gap fillers have the disadvantage of causing the components to stick or at least of creating cohesion between the components, thereby impeding or even preventing their removal.

The laying-open specification DE 10 2013 207 534 describes the use of conductive adhesives and gap fillers between battery cells and cooling plates, whereby a large-area bonding and stable connection are provided. Unlike gap fillers, the conductive adhesive here does not form an electric insulation. The effect provided by the stable, difficult-to-release connection is consciously utilized.

A storage unit with a cooling element for storing electric energy is described in EP 2 511 922 A1. An electrically insulating and thermally conductive polyimide film is arranged as an insulating layer between the energy storage unit and the cooling element and is coated with adhesive on both sides. The entire structure is held together by this means and a high mechanical strength is provided in an advantageous way.

DE 10 2014 203 765 A1 discloses a production process for an assembly consisting of an energy storage module and a cooling element. A thermally conductive layer of an adhesive material with good thermal conducting properties is inserted between the contact sides of the assembly to securely attach the components to one another that are to be adhered together. If the thermally conductive layer is designed to be adhesive on one side only, then a thermally conductive adhesive is applied to the other side in order to ensure the two-sided adhesive action of the connecting layer.

SUMMARY

The present disclosure will be described below primarily in connection with vehicle batteries or battery modules in vehicles. It is to be understood, however, that the present disclosure may be used in any application in which electrical and/or electronic assemblies have to be cooled, where a connection is made via thermally conductive material and dismounting should be possible.

The present disclosure provides a device that creates good transfer of heat between a cooling device and an energy storage unit, in which only slight forces are used for installation and the energy storage unit can be more easily separated from the cooling device.

Accordingly, a cooling device has a cooling plate to cool an energy storage unit. For this purpose the energy storage unit is in thermal contact with the cooling plate. When the energy storage unit is arranged on the cooling plate, a thermally conductive foil and a thermally conductive filling layer are arranged between the cooling plate and the energy storage unit.

The solution introduced here employs a gap filler as the thermally conductive filling layer for the thermal connection, with the advantages already presented, namely that upon compression the spreading out ensures that the energy storage unit is connected to the cooling plate over a large area and that lower forces act on the energy storage and cooling plate modules as compared to gap pads. Through the use of an additional thermally conductive foil, the adhesive effect and/or the adhesion forces are reduced.

The energy storage unit, for example, may have or be an energy storage cell, a lead battery, a nickel-metal hydride cell, a nickel-cadmium cell, a zinc-air cell, a lithium-air cell, a nickel-zinc cell, a lithium-ion cell, a fuel cell or a double-layer capacitor, among others.

A filling layer is understood to be a thermally conductive paste, a gap filler or a casting material. The filling layer is designed to at least partially fill out an area between the energy storage unit and the cooling device. Irregularities are easily compensated in this way, thereby improving the thermal contact between the relevant energy storage unit and the cooling plate as the carrier element. The filling layer also creates a sturdy, low-vibration mount of the energy storage unit on the cooling plate.

The thermally conductive foil has favorable thermally conductive properties. Thus, the thermally conductive foil creates an effective thermal transition from one side or surface of the thermally conductive foil to the opposite side or surface of the thermally conductive foil. This is achieved by the selection of the material and the thickness of the thermally conductive foil. The thermally conductive foil may have a smooth (not "bumpy" or without surface irregularities), non-adhesive surface. By this means, the removability of the energy storage unit from the cooling device can be achieved in an advantageous way.

The thermally conductive foil may be designated as a first thermal coupling element or as a first intermediate layer, and the filling layer may be designated as a second thermal coupling element or as a second intermediate layer.

The thermally conductive foil and the filling layer as intermediate layers create or improve a thermal connection of the energy storage unit to the cooling device via the cooling plate. The filling layer and the thermally conductive foil serve to improve the heat dissipation from the energy storage unit toward the cooling plate of the cooling device. The filling layer makes it possible to keep thermally insulating air gaps from forming between the cooling plate and the energy storage unit. In this way, the heat dissipation can be considerably improved. The filling layer may be slightly adhesive. In one form it may be advantageous for the filling layer to adhere very strongly in order to achieve a defined state during removal. In this case, during a dismounting process the filling layer and the thermally conductive foil remain on the module adjoining the filling layer, and the separation of the components occurs on the upper side of the thermally conductive foil, i.e. the side facing away from the filling layer. In addition, the filling layer may serve to compensate for the tolerances between the cooling plate and the energy storage unit.

It is advantageous for a surface of the thermally conductive foil to be in contact with a surface of the filling layer. Thus, the thermally conductive foil and the filling layer are arranged to lie directly on one another with no additional intermediate layer.

The thermally conductive foil may also be electrically insulating. Thus it is possible to prevent electric energy from being conducted from the energy storage unit into the cooling device, thereby posing the hazard of electric shock to a user or a technical system connected to the cooling device. If the energy storage unit involved is a high-voltage energy storage unit, the thermally conductive foil is provided in the form of a high-voltage insulating foil to secure voltages in excess of 60 V. The thermally conductive foil is also advantageously failsafe for voltages in excess of 60 V, particularly for voltages up to 500 V, or even better, up to at least 1000 V.

To improve the removability of the energy storage unit it is of advantage for the thermally conductive foil and the filling layer to overlap in the area in which the energy storage unit and the cooling plate are in superimposed arrangement. For instance, it is advantageous for the thermally conductive foil to completely cover the layer formed by the filling layer. An overlap of as little as 30% already results in a measurable improvement. The connection between the energy storage unit and the cooling plate is all the more easily released, the greater the overlapping area is between the thermally conductive foil and the filling layer.

In one form, the thermally conductive foil is arranged with its entire surface in the overlapping area of the energy storage unit and the cooling device, with the result that the energy storage unit is electrically insulated from the cooling device, provided that the thermally conductive foil is electrically insulating.

In addition, the filler layer may have a liquid to a pasty consistency at the time of assembly. Thus, the filler layer may have a gelatinous consistency at the time of assembly. As described above, the task of the filler layer is to prevent air gaps between the energy storage unit and the cooling plate and to thereby improve the transfer of heat. In this way, the filler layer can compensate irregularities and tolerances between the energy storage unit and the cooling plate. To this end it is advantageous for the filler layer to be capable of spreading out at the time of assembly. It may also be of advantage here if the filler layer is cured following assembly or at least hardens further to remain permanently in the desired position.

Finally, a sandwich-type thermally conductive foil may also be arranged between the energy storage unit and the cooling plate. The thermally conductive foil and the additional sandwich-type thermally conductive foil may be similar or identical in terms of material, thickness, size, etc. Also, for reasons of cost one of the two foils can be electrically conductive and the other electrically insulating. This results in different types or a different order of the sandwich arrangement. For example: sandwich-type thermally conductive foil—filler layer—thermally conductive foil, or as an alternative, filler layer—sandwich-type thermally conductive foil—thermally conductive foil—filler layer. Arranging the filler layer directly on the cooling plate and directly on the energy storage unit creates a particularly good connection to these units, while at the same time the two thermally conductive foils provide easy removability.

In a particularly favorable sandwich arrangement the filler layer is placed between the thermally conductive foil and the sandwich-type thermally conductive foil. In this case, the filler layer is neither directly connected to the cooling plate nor to the energy storage unit. For this reason the filler layer can be removed especially easily, leaving no residue behind.

In a favorable form the filler layer is electrically insulating. This can improve the dielectric strength. The thickness of the filler layer may also be adapted, particularly enlarged, for this. The filler layer may be designed or configured as a high-voltage insulating layer. Electrical insulation is also achievable through selection of an appropriate material.

In an advantageous variant the cooling device may have an attachment means. The attachment means may be used to mechanically connect the energy storage unit to the cooling device. Since the combination of filler layer and thermally conductive foil according to the present disclosure does not create a sturdy mechanical connection, but rather ensures easy dismounting, an additional mechanical coupling is advantageous.

The attachment means may include at least one screwed connection. At least three points of attachment may be provided for a secure attachment, of which at least one point of attachment may be provided as a screwed connection. One or more points of attachment may be in the form of a clamp connection or a positive fit.

The attachment means may be an assembly aid and additionally or alternatively as an extractor. An extractor may be understood to be a mechanical device designed to exert a defined pulling force on the cooling device and additionally or alternatively on the energy storage unit in order to separate the two modules from one another. Thus, the attachment means at one screwing point can be in the form of an extractor. The extractor can lift the energy storage unit from the cooling plate at selective points. The extractor here may have a thread and a lifting mechanism that interacts with the thread. A turning motion of the extractor causes the lifting mechanism to alter its position relative to the thread, corresponding to the lead of the thread. A displacement-controlled pulling force can be initiated in this way.

The thermally conductive foil is a very thin film or foil with a large area, made particularly of plastic or metal. Thus, the thermally conductive foil may be elastic/flexible to enable it to more easily adapt to the surface of the energy storage unit or of the cooling plate. The thermally conductive foil may have a thickness of between approximately 4 µm and approximately 1 mm. In this connection, the thickness of the thermally conductive foil depends on the material used and on the electrical properties. The thermally conductive foil may also have a number of layers of different materials. The thermally conductive foil advantageously has a maximum thickness of 500 μm. In a particular form the thickness of the thermally conductive foil lies within a range of between approximately 10 μm and approximately 100 μm, and in a particularly advantageous variant within a range of between 10 μm and 55 μm. The discussion of the thermally conductive foil may also be applied analogously to the sandwich-type thermally conductive foil. Not only the selection of a material, but also the thickness of the foil can influence properties such as electrical insulation, thermal conductivity, puncture and wear resistance, including protection from wearing through, and can be used to adapt those properties to an application.

A polyimide film is a favorable form of the thermally conductive foil and where applicable also of the sandwich-type thermally conductive foil. Such films, for instance those with a thickness of between 45 μm and 55 μm, are described among other things in DE69705048 or DE69702867 for a different application. They are available under brand names such as Kapton® conductive films by DuPont.

In a special form the thermally conductive film or foil and additionally or alternatively the sandwich-type thermally conductive film or foil may include an organic matrix. For example, an organic matrix here may be understood to be: polypropylene (PP), thermoplastic polyurethane (TPU), polyphenylene sulfide (PPS), polycarbonate (PC), polyamide (PA) or polybutylene terephthalate (PBT). As an alternative it may be a metal foil, for example an aluminum foil. The thermally conductive foil may also be a graphite foil.

In a special further development the thermally conductive foil is fiber reinforced. For this, fibers of glass, carbon or, for example, aramid may be used, and the fiber reinforcement may be in the form of fabrics, multi-axial mats and combinations thereof. This can improve the puncture resistance. Fiber reinforcement can also provide effective protection against wearing through or it can improve protection of this kind.

The idea behind the present disclosure can also be implemented in a process. A method for thermally connecting an energy storage unit to a cooling device having a cooling plate includes at least the steps of provision, application and positioning.

Depending on the desired structure of the cooling device, first of all either the energy storage unit or the cooling device itself is made available. In order to simplify the description, it is assumed below that the cooling device with the cooling plate is made available first. In a first variant a thermally conductive foil is applied to the cooling plate, followed by a thermally conductive filler layer. In an alternative form the filler layer is applied first and then the thermally conductive foil. The filler layer can be sprayed on, for example. Finally, the energy storage unit is then put into position and possibly compressed in the direction of the cooling plate. The filler layer here spreads out and closes all gaps. The spreading of the filler layer provides that the energy storage unit is connected to the cooling plate over a large area. The filler layer compensates irregularities, thereby creating a large-area thermal connection. Thus, the filler layer and the thermally conductive foil are arranged as intermediate layers between the energy storage unit and the cooling plate.

In one variant, in an optional step of pre-pressing, the filler layer (gap filler) and the thermally conductive foil are pre-pressed/distributed by a device (such as a simple plate). Then, in the positioning step the modules only have to exert very little force. In this way, the forces acting on the energy storage unit and the cooling plate can be advantageously reduced, thereby protecting them from damage.

Additional, particularly advantageous forms and further developments of the present disclosure can be found in the claims and in the following description, in which the features of different forms may be combined to form new variants. Specifically, the independent claims of one category of claims may also be further developed analogously to form the dependent claims of a different category.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 10-12b show schematic drawings of an attachment device according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The solution presented here is essentially described by supplementing the gap filler (filler layer) with a thin and thermally conductive but not adhesive foil. Thus, the adhesion of the gap filler is not of concern, and the foil provides separability between the module (energy storage unit) and the base plate (cooling plate). Conventional gap pads could in fact meet this requirement, however, they often require disadvantageously high compression forces that cannot be absorbed by the module or the base plate (cooling, floor plate or the like).

Figure 1:
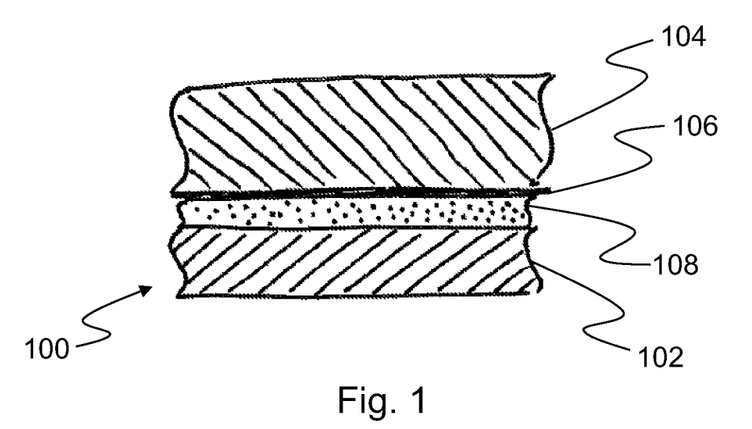
FIG. 1 shows a simplified cross-sectional view of a cooling device for an energy storage unit according to one form of the present disclosure.

FIG. 1 shows a simplified cross-sectional view of a cooling device 100 for an energy storage unit 104 according to one form of the present disclosure. A thermally conductive foil 106 and a filler layer 108 are arranged between a cooling plate 102 of the cooling device 100 and the energy storage unit 104. Both the foil 106 and the filler layer 108 are thermally conductive. The filler layer 108 is also referred to as a gap filler.

Depending on the form concerned, the thermally conductive foil is a plastic film or metal foil. In one variant it is an aluminum foil with a thickness of approximately 4 µm to 0.5 mm. In another variant it is a polyimide film (Kapton® conductive film) with a thickness of approximately 45 µm to approximately 55 µm, particularly a thickness of within a tolerance range around 51 µm. As an alternative, one variant involves a plastic stretch film with a thickness of approximately 10 µm to 20 µm. Other variants are also conceivable and should be construed to be within the scope of the present disclosure.

The thermally conductive foil is defined in particular by its properties. In one favorable form of the foil is electrically insulating. Additional positive properties are puncture resistance and dielectric strength.

In another form the filler layer, which at least at the time of assembly is gelatinous or pasty, is electrically insulating. In the case of applications in the high-voltage range, i.e. at least greater than 60 V, the filler layer and additionally or alternatively the thermally conductive foil insulates against high voltage.

In FIG. 1 the thermally conductive foil 106 is shown adjacent the energy storage unit 104 and the filler layer 108 is arranged between the cooling plate 104 and the thermally conductive foil 106. In an alternative form the thermally conductive foil 106 is adjacent to the cooling plate 102.

Figure 2:
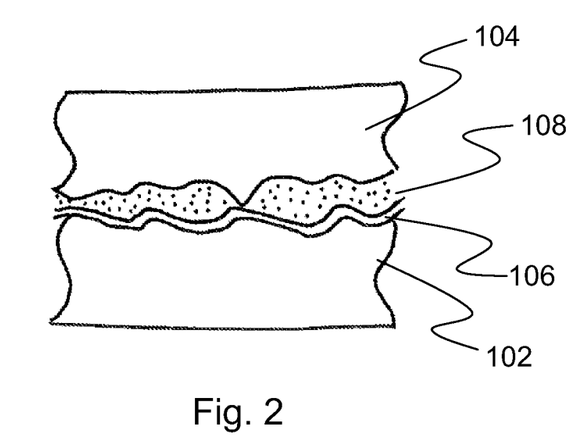
FIGS. 2-5 show additional simplified cross-sectional views of different cooling devices for an energy storage unit according to variants of the present disclosure.

The drawing in FIG. 2 differs from that of FIG. 1 in that surface irregularities in the energy storage unit 104 and the cooling plate 102 are exaggerated. Without the filling layer 108 the modules 102, 104 would be in thermal contact with each other only at a few places and many or large air pockets could impede an effective transfer of heat. The gelatinous filler layer 108 completely fills in the intermediate space and creates an improved heat transfer. The thermally conductive foil 106 is flexible and/or elastic in order to hug the surface of the cooling plate 102. What is not shown in FIG. 2 is that the thermally conductive foil 106 may also be arranged on the surface of the energy storage unit 104 and can adapt to or hug it.

Figure 3:
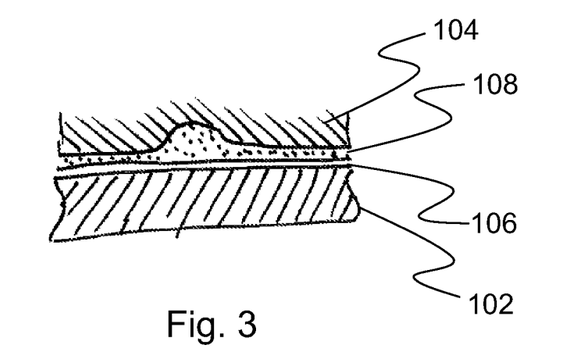

FIG. 3 also resembles the description relating to FIGS. 1 and 2 in design and structure. The energy storage unit 104 has a sink or groove (with no reference number), which is completely filled by the filler layer. In this case, the thermally conductive foil is advantageously arranged directly on the cooling plate. This is shown as an example of the fact that tolerances, irregularities, protrusions or recesses in the surface of the modules 102, 104 can be compensated by the filler layer 108 to improve the transfer of heat.

Figure 4:
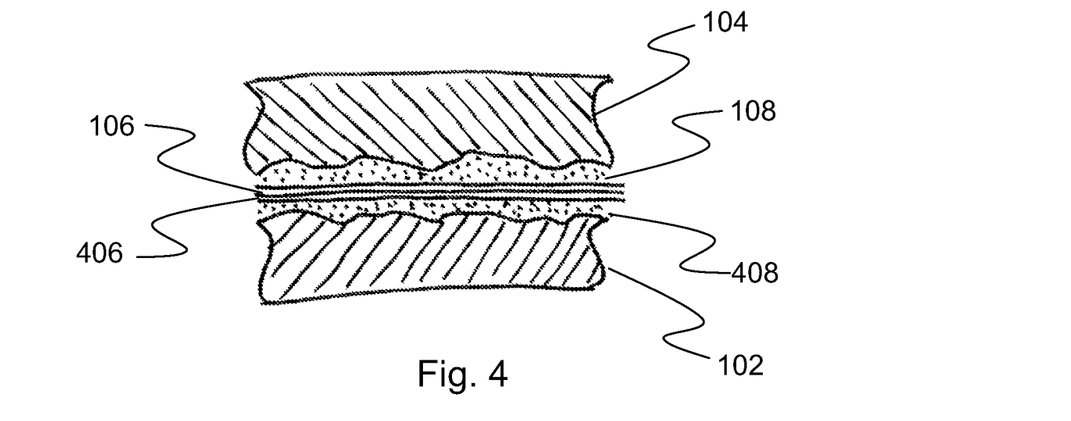
Figure 5:
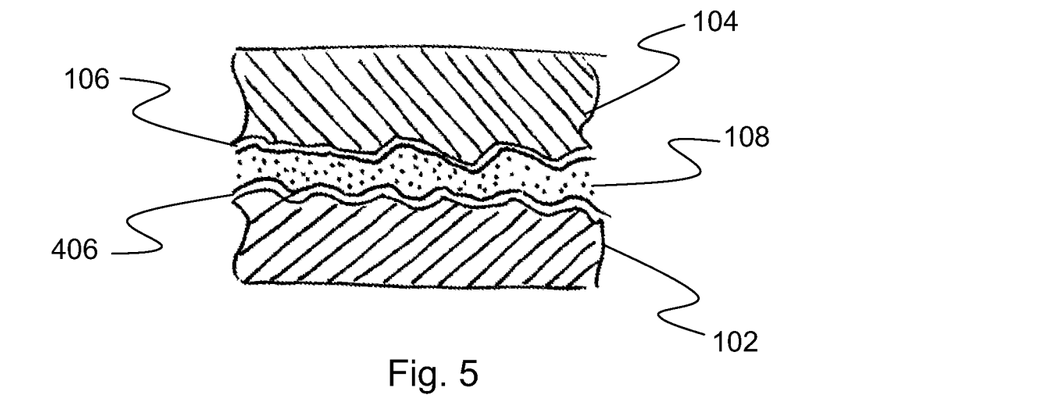

FIG. 4 and FIG. 5 show an additional sandwich-type thermally conductive foil 406 arranged between the energy storage unit 104 and the cooling plate 102. In FIG. 4 the thermally conductive foil 106 and the additional sandwich-type thermally conductive foil 406 lie in direct contact with one another. The space between the thermally conductive foil 106 and the energy storage unit 104 is occupied by a first filler layer 108. The space between the sandwich-type thermally conductive foil 406 and the cooling plate 102 is occupied by a second filler layer 408. The two filler layers 108, 408 are gelatinous or pasty materials that are applied and provide a large-area connection/coverage by spreading out upon compression. The advantage of this is that these forces are considerably lower than would be the case with gap pads. The two thermally conductive foils 106, 406 are easily separated from one another. The thermally conductive foils 106, 406 inhibit adhesive action by the filler layer 108, 408 or cohesion caused by the filler layer 108, 408.

Unlike FIG. 4, in the form shown in FIG. 5 the filler layer 108 is arranged between the thermally conductive foil 106 adjacent the energy storage unit 104, and the sandwich-type thermally conductive foil 406 adjacent the cooling body 102. In the event of dismounting, the filler layer 108 can be removed without much if any residue.

Figure 6:
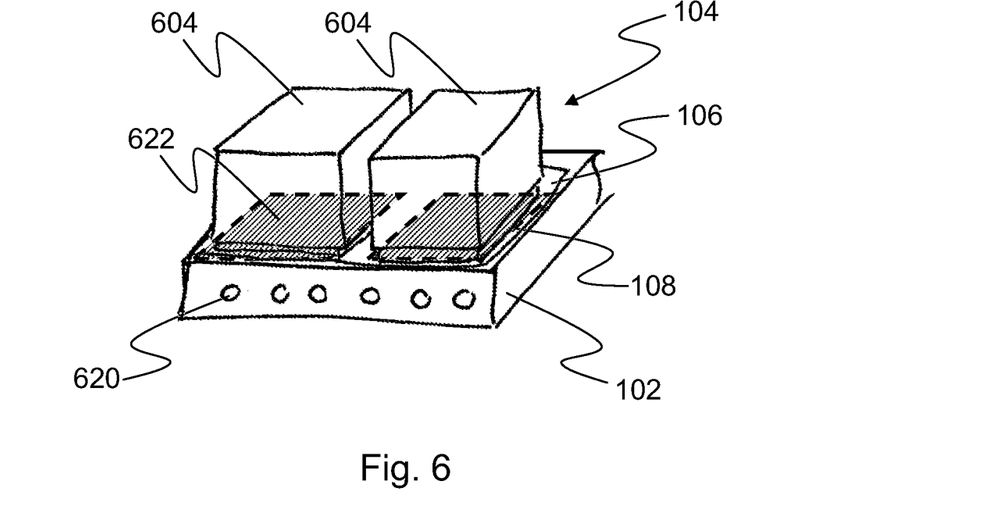
FIG. 6 shows a cooling device for at least two energy storage units according to another form of the present disclosure.

FIG. 6 shows a cooling device 100 for two or more power cells 604 of an energy storage unit 104 according to an additional form of the present disclosure. The cooling plate 102 has cooling ducts 620. The cooling ducts 620 are designed to be cooled by a liquid coolant flowing through them, in order to improve the heat dissipation. A thermally conductive foil 106 is arranged on the cooling plate 102. One filling layer 108 each is arranged between the thermally conductive foil 106 and the power cells 604. Thus, a first filler layer 108 is arranged in the overlapping area of the first power cell 604 and the cooling plate 102, and a second filler layer 108 is arranged in the overlapping area of the second power cell 604 and the cooling plate 102. The thermally conductive foil 106 covers the overlapping areas and extends beyond them.

If the thermally conductive foil 106 is electrically insulating, then it also provides electrical insulation due to its size.

Figure 7:
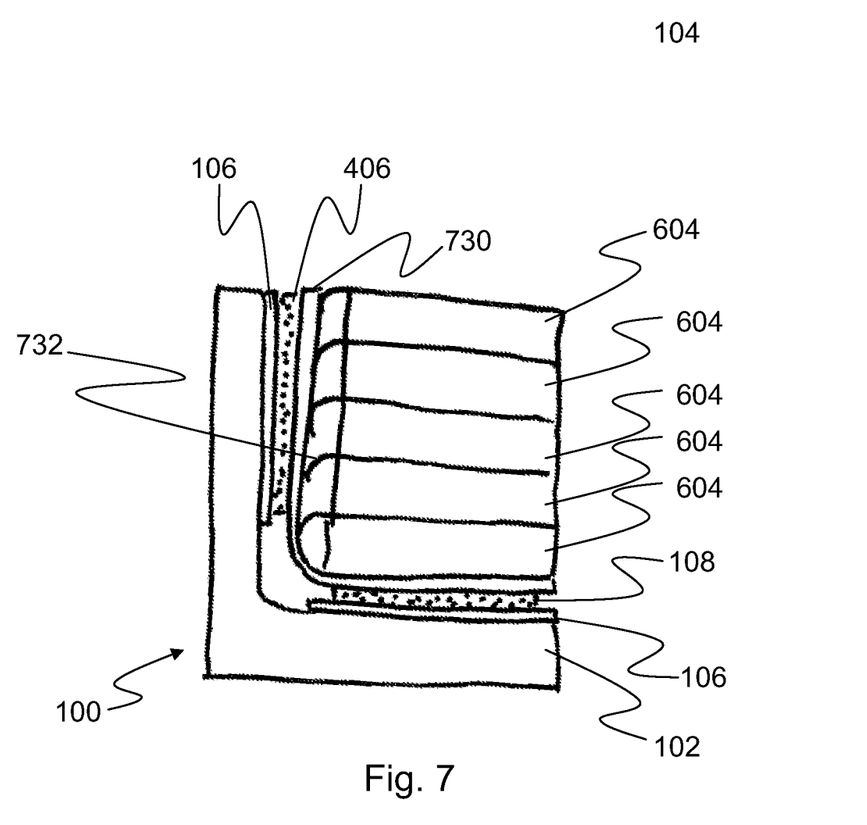
FIG. 7 shows a simplified cross-sectional view of a two-sided connection of an energy storage unit to a cooling device according to embodiment form of the present disclosure.

FIG. 7 shows a simplified cross-sectional view of a two-sided connection of an energy storage unit 104 and a cooling device 100 according to one form of the present disclosure. The energy storage unit 104 is made up of a plurality of power cells 604. Cooling fins 732 arranged between the power cells 604 are attached to a baffle 730. The baffle 730 is guided on at least two sides of the energy storage unit 104. The cooling plate 102 is arranged on the same sides of the energy storage unit 104 as the baffle 730. The baffle 730 is thermally connected, i.e. in a thermally conductive manner, to the cooling plate 102 via a filler layer 108, 408 and a thermally conductive foil 106.

The form shown in FIG. 7 demonstrates that it is also possible to connect the energy storage unit 104 to the cooling device 100 on multiple sides. Through the use of the thermally conductive foil 106, dismounting remains possible.

Figure 8:
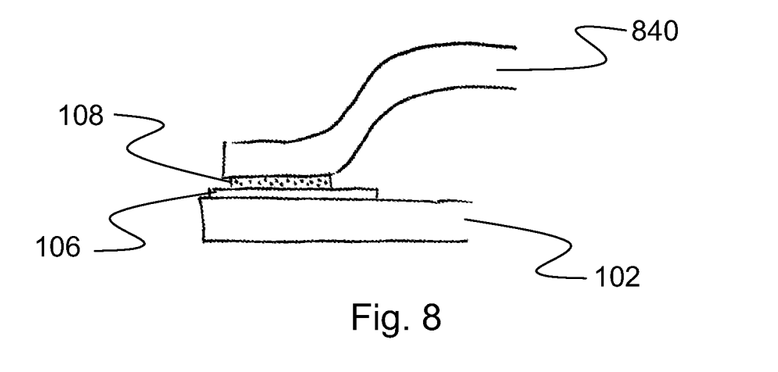
FIG. 8 shows a simplified cross-sectional view of a connection of a busbar to a cooling plate according to one form of the present disclosure.

FIG. 8 shows a simplified drawing of a connection of a busbar 840 to a cooling plate 102 according to one form of the present disclosure. Electric energy stored in an energy storage unit is made available via the busbar 840 to loads connected to the busbar 840. For this reason, the busbar 840 may be considered part of the energy storage unit. A thermally conductive foil 106 and a filler layer 108 are arranged between the busbar 840 and the cooling plate 102.

In another form, both the filler layer 108 and the thermally conductive foil 106 are electrically conductive. In this case, the cooling plate 102 additionally fulfills a double function as an electric conductor and part of the cooling device.

Figure 9:
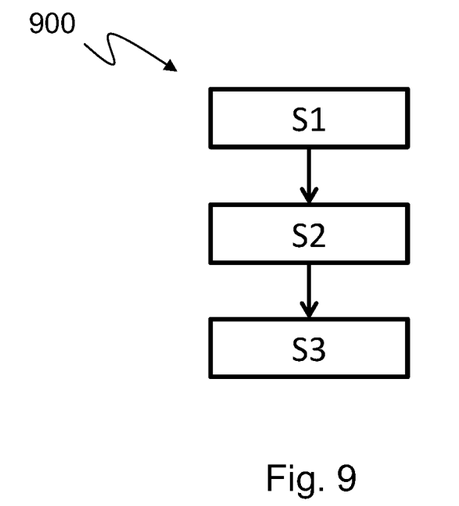
FIG. 9 shows a flowchart of a process according to one form of the present disclosure.

FIG. 9 shows a flowchart of a process 900 according to one form of the present disclosure. To facilitate understanding the reference numbers relating to FIGS. 1-8 will be kept as references in the following description. The method 900 for thermally connecting an energy storage unit 104 to a cooling device 100 with a cooling plate 102 includes a step S1 of provision, a step S2 of application and a step S3 of positioning.

In a first form, the cooling device 100 is made available in the provision step S1. This is followed in step S2 by the application of the thermally conductive foil 106 and the thermally conductive filler layer 108 onto the cooling plate 102 of the cooling device 100. Finally, in the positioning step S3, the energy storage unit 104 is made available and arranged on the filler layer 108 or the thermally conductive foil 106. Thus, the thermally conductive foil 106 and the filler layer 108 are arranged between the energy storage unit 104 and the cooling plate 102.

In an alternative form, in the provision step S1 the energy storage unit 104 is made available and, accordingly, in the positioning step S3, the cooling plate 102 of the cooling device 100 is moved into position.

In the process, the gelatinous or pasty, and in some cases also a liquid filling layer may be injected in the application step S2. After the positioning step S3, which may be followed by an optional compression step, the filler layer generally hardens in consistency to avoid subsequently changing its position. This curing can be enhanced by the action of temperature or gas (particularly oxygen) or irradiation (such as infrared).

Figure 10:
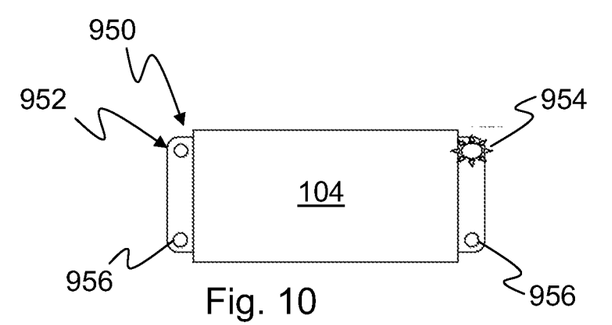
Figure 11:
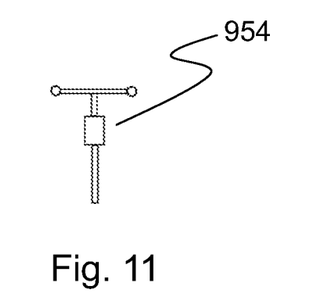
Figure 12A:
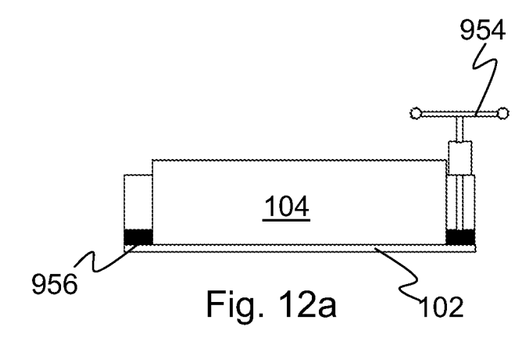
Figure 12B:
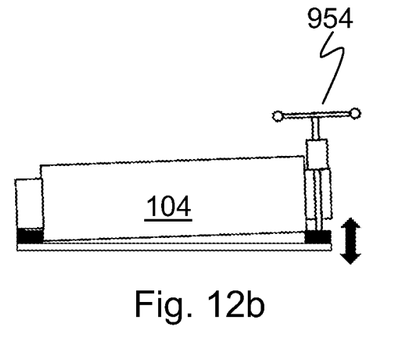

FIGS. 10 to 12 show schematic drawings of an attachment device 950 according to one form of the present disclosure. The attachment device 950 in this variant is provided in the form of a screwed connection 952 with up to four screws. The energy storage unit 104 has four screwing points 956 for this. Three of the screws are screwed in and can therefore be removed and for the fourth screwing point 956 an "extractor" 954 is used. As explained further below, the extractor 954 has a dual function. It serves to affix the energy storage unit 104 and also, in a second function after being converted it acts as an extractor. To this end, the extractor 954 has an arrangement that interacts with a thread of the extractor 954, as it presses against the cooling plate 102 and lifts the energy storage unit at this screwing point 956, corresponding to the lead of the thread of the extractor 954. The rotary movement of the extractor 954 is converted to a slow linear movement perpendicular to the main extension of the cooling plate 104.

The energy storage unit 104 should be dismountable for servicing. Due to the adhesion by the filler layer or the gap filler (which are partly also adhesive) this is possible only under certain conditions. As indicated above, for servicing it is advantageous to reduce the adhesion with a thermally conductive foil. In addition, a mounting aid 954 or "extractor" 954 is integrated into the forms shown in FIGS. 10 to 12. One tool is used or added here for assembly and dismounting. An example of the function of the extractor 954 is shown by a thread that interacts with a guide means of the extractor 954, thereby lifting the module, i.e. the energy storage unit 104, at a certain point, thus slowly initiating the extraction force in a displacement-controlled manner.

By this means a cost-effective solution is created, since only one tool is required for assembly and dismounting. The result is a reproducible procedure in servicing situations and hence a lower probability of errors. Gap fillers or gap pads are used to meet existing tolerances between the energy storage unit 104, which for example may be a battery module 104, and the cooling device 100 or a thermally conductive component such as a cooling plate 102. They compensate irregularities, thereby providing a large-area, thermal connection of the battery module.

An extractor 954 is used in addition to the improvements resulting from the use of an additional thermally conductive foil as described in FIGS. 1 to 8.

Dismounting can be initiated at one point or at several points, depending on the geometry of the module.

For various reasons, prying the battery module 104 out as an alternative to using the extractor introduced here is not practicable or possible. Usually the accessibility of the sides of the module 104 is inadequate or not possible at all, due to the available space and surrounding parts. Furthermore, the force in this case would be introduced at the bottom of the module, which would possibly damage the module and in the worst case cause exposure of the power cells installed in the energy storage unit. In addition, prying out is not a controlled or reproducible process and it depends on the worker doing the dismounting. As opposed to this, using the extractor described here can ensure the appropriate process safety.

The extractor can generally be used for any component that is connected to a heat sink 102 via a gap filler 108 and that must be dismountable, particularly such as the HV battery module 104 presented here.

Since the devices and processes described above in detail are variations given as examples, they may be modified extensively in the usual manner by someone skilled in the art without departing from the scope of the present disclosure. In particular, the mechanical arrangements and the proportions of the individual elements in relation to one another are given merely as examples.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A cooling device comprising:
a cooling plate configured for an energy storage unit to be arranged on;
intermediate layers disposed on the cooling plate, wherein the intermediate layers comprise:
a flexible thermally conductive foil; and
a thermally conductive filler layer in contact with the flexible thermally conductive foil, wherein a smooth non-adhesive surface of the thermally conductive foil is in contact with the cooling plate and the thermally conductive filler layer is in contact with the energy storage unit arranged on the cooling plate; and
an attachment device configured to mechanically connect the energy storage unit to the cooling device, the attachment device comprising screwing points and an extractor comprising threads configured to interact with one of the screwing points, the extractor thereby configured to lift the energy storage unit.

2. The cooling device according to claim 1, wherein the thermally conductive foil is electrically insulating.

3. The cooling device according to claim 2, wherein the thermally conductive foil is electrically insulating up to at least 1,000 volts (V).

4. The cooling device according to claim 1, wherein the thermally conductive foil and the thermally conductive filler layer cover an overlapping area between the cooling plate and the energy storage unit.

5. The cooling device according to claim 4, wherein the thermally conductive foil is arranged to completely cover the overlapping area such that the energy storage unit is electrically insulated from the cooling device.

6. The cooling device according to claim 1, wherein the thermally conductive filler layer defines a form of at least of one liquid and pasty at a time of assembly.

7. The cooling device according to claim 1, wherein the thermally conductive filler layer is electrically insulating.

8. The cooling device according to claim 7, wherein the thermally conductive filler layer is electrically insulating up to at least 1,000 volts (V).

9. The cooling device according to claim 1, wherein the thermally conductive foil has a thickness between 4 µm and 1 mm.

10. The cooling device according to claim 1, wherein the thermally conductive foil is a polyimide film.

11. The cooling device according to claim 1, wherein the thermally conductive foil comprises an organic matrix.

12. An apparatus comprising:
a cooling plate;
an energy storage unit;
intermediate layers disposed between the cooling plate and the energy storage unit, wherein the intermediate layers comprise:
 a flexible thermally conductive foil; and
 a thermally conductive filler layer in contact with the flexible thermally conductive foil, wherein a smooth non-adhesive surface of the thermally conductive foil is in contact with the cooling plate and the thermally conductive filler layer is in contact with the energy storage unit; and
an attachment device configured to mechanically connect the energy storage unit to the cooling device, the attachment device comprising screwing points and an extractor comprising threads configured to interact with one of the screwing points, the extractor thereby configured to lift the energy storage unit.

13. A cooling device comprising:
a cooling plate configured for an energy storage unit to be arranged on;
intermediate layers disposed on the cooling plate, wherein the intermediate layers comprise:
 a flexible thermally conductive foil arranged on the cooling plate and
 a thermally conductive filler layer in contact with the flexible thermally conductive foil, wherein a smooth non-adhesive surface of the thermally conductive foil is in contact with the energy storage unit arranged on the cooling plate; and the thermally conductive filler layer is in contact with the cooling plate; and
an attachment device configured to mechanically connect the energy storage unit to the cooling device, the attachment device comprising screwing points and an extractor comprising threads configured to interact with one of the screwing points, the extractor thereby configured to lift the energy storage unit.

* * * * *